United States Patent
Chi et al.

(10) Patent No.: US 10,056,020 B2
(45) Date of Patent: *Aug. 21, 2018

(54) WAVEGUIDE DISPLAY WITH TWO-DIMENSIONAL SCANNER

(71) Applicant: Oculus VR, LLC, Menlo Park, CA (US)

(72) Inventors: Wanli Chi, Sammamish, WA (US); Pasi Saarikko, Kirkland, WA (US); Hee Yoon Lee, Redmond, WA (US)

(73) Assignee: Oculus VR, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/292,556

(22) Filed: Oct. 13, 2016

(65) Prior Publication Data

US 2017/0235143 A1 Aug. 17, 2017

Related U.S. Application Data

(60) Provisional application No. 62/294,131, filed on Feb. 11, 2016.

(51) Int. Cl.
| | |
|---|---|
| *G02B 26/08* | (2006.01) |
| *G09G 3/02* | (2006.01) |
| *G02B 27/01* | (2006.01) |
| *F21V 8/00* | (2006.01) |
| *G09G 3/34* | (2006.01) |

(Continued)

(52) U.S. Cl.
CPC ........... *G09G 3/025* (2013.01); *G02B 6/0001* (2013.01); *G02B 6/0016* (2013.01); *G02B 6/0035* (2013.01); *G02B 26/0833* (2013.01); *G02B 26/101* (2013.01); *G02B 26/105* (2013.01); *G02B 27/0172* (2013.01); *G02B 27/141* (2013.01); *G02B 27/145* (2013.01); *G09G 3/2096* (2013.01); *G09G 3/3406* (2013.01); *G09G 3/346* (2013.01);

(Continued)

(58) Field of Classification Search
CPC ...... G09G 3/025; G09G 3/346; G09G 3/3406; G09G 3/2096; G09G 3/02; G09G 3/20; G02B 27/0172; G02B 6/0016; G02B 6/0035; G02B 2027/0178; G02B 2027/0125; G02B 27/01
USPC ...................................... 359/204.2
See application file for complete search history.

(56) References Cited

U.S. PATENT DOCUMENTS

2004/0076203 A1* 4/2004 Kaminsky ............. G03B 21/56
372/39

* cited by examiner

*Primary Examiner* — Euncha Cherry
(74) *Attorney, Agent, or Firm* — Fenwick & West LLP

(57) ABSTRACT

A waveguide display includes a light source, a conditioning lens assembly, a scanning mirror assembly, and a controller. The light source includes a plurality of source elements that are configured to emit image light in accordance with scanning instructions. The conditioning lens assembly transmits conditioned light based in part on the image light. The scanning mirror assembly scans the conditioned image light to particular locations as scanned image light in accordance with scanning instructions. The output waveguide includes an input area and an output area, receives the scanned image light emitted from the scanning mirror assembly at the input area, and outputs the expanded image light from a portion of the output area based in part on a direction of the expanded light output from the scanning mirror assembly. The controller generates the scanning instructions and provides the scanning instructions to the light source and the scanning mirror assembly.

29 Claims, 6 Drawing Sheets

(51) Int. Cl.
*G09G 3/20* (2006.01)
*G02B 26/10* (2006.01)
*G02B 27/14* (2006.01)

(52) U.S. Cl.
CPC .............. *G02B 2027/0114* (2013.01); *G02B 2027/0125* (2013.01); *G02B 2027/0178* (2013.01)

WAVEGUIDE DISPLAY WITH TWO-DIMENSIONAL SCANNER

CROSS REFERENCE TO RELATED APPLICATIONS

This application claims the benefit of U.S. Provisional Application No. 62/294,131, filed Feb. 11, 2016, which is incorporated by reference in its entirety.

BACKGROUND

This disclosure relates generally to near-eye-displays, and in particular, to waveguide displays including 2-dimensional (2-D) scanners.

In conventional display designs in near-eye-displays, the factors considered are brightness, resolution, and compactness. Typical MEMS scanners use a collimated laser beam for scanning which can be high power and have a good efficiency to be directed to image location, and the image can be as bright as needed. While laser-based MEMS scanners are compact, they have issues with resolution.

Mirror size and resonance frequency are two fundamental limits for resolution. In the far-field, mirror size determines the diffraction spread angle of the scanned laser beam. A large mirror is required to have a smaller diffraction spread angle. The resonance frequency determines how many lines can be scanned in a vertical (slow-axis) direction. Accordingly, a high resonance frequency is desired to generate more scan lines. When the mirror is made larger, its resonance frequency is always smaller. Typical MEMS scanners are unable to scan more number of lines with a large mirror due to this trade-off between mirror size and resonance frequency.

SUMMARY

A waveguide display used as part of a virtual reality (VR) system, augmented reality (AR) system, mixed reality (MR) system, or some combination thereof. In some embodiments, the waveguide display may be included in an eyewear comprising a frame and a display assembly that presents media to a user's eyes. The display assembly includes a source assembly and an output waveguide. The source assembly emits image light to the output waveguide which expands the image light and outputs the expanded image light to the user's eyes.

The source assembly includes a light source and an optics system. A controller controls scanning operation on the components in the source assembly, such that image light is coupled into the output waveguide, which outputs the image light toward the user's eyes.

The light source includes one or more source elements (e.g. lasers). The one or more source elements may emit light in the same wavelength range (e.g., all emit the same color). Alternatively, some source elements may emit light at different wavelength ranges than other source elements (e.g., one source emits in red, another emits in blue, and another emits in green). In some embodiments, a plurality of source elements forms an array. The light source emits light in accordance with scanning instructions from a controller.

The optics system includes one or more optical elements that condition (e.g., expand and/or collimate) light received from the light source. The optics system also includes one or more scanning mirrors (e.g. galvanometer mirror, MEMS mirror) that scan light received from the conditioning lens. In one embodiment, the optics system includes a focusing assembly, a color converter assembly, a conditioning lens assembly, and a scanning mirror assembly. The focusing assembly transmits a focused light using the beam of image light from the light source. The color converter assembly changes the wavelength of the focused light to a specific bandwidth. The conditioning lens assembly receives a colored light from the color converter assembly and transmits a collimated light. The scanning mirror assembly receives the collimated light from the conditioning lens assembly and reflects a scanned light to the output waveguide.

In another embodiment, the optics system includes a combining lens assembly, a conditioning lens assembly, and a scanning mirror assembly. The combining lens assembly transmits a combined light using the source light from each of the source elements in the light source. The conditioning lens assembly receives the combined light from the combining lens assembly and conditions (e.g. collimation and beam expansion) the combined light. The scanning mirror assembly receives the conditioned light from the conditioning lens assembly and outputs a scanned light to the output waveguide. The scanning mirrors in the scanning mirror assembly are coupled to a controller that performs an interlaced scanning of the scanning mirrors. The interlaced scanning may be based on shifting a current position of the conditioning lens assembly by introducing a small offset in a driving voltage of the scanning mirrors for a set of neighboring video frames.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Figure 1:
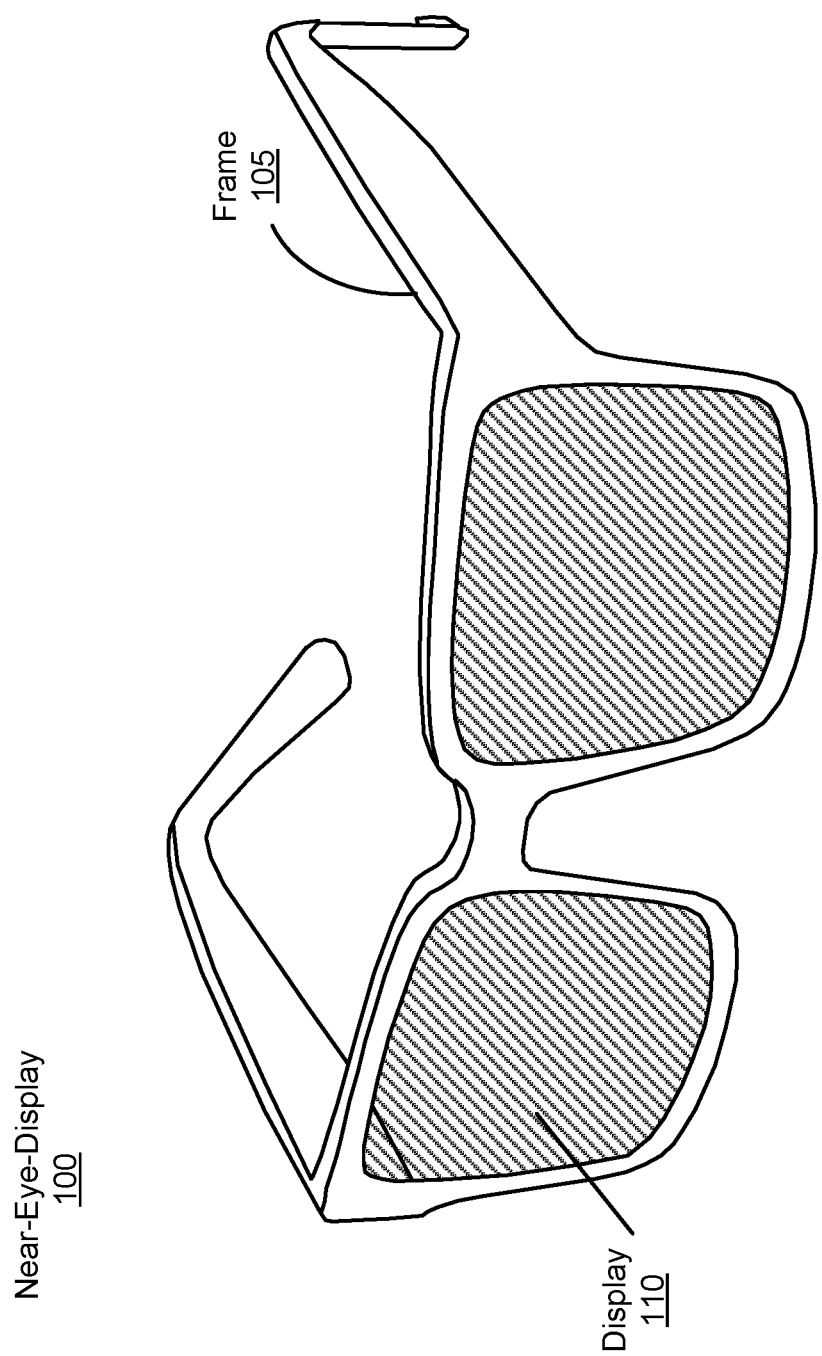
FIG. 1 is a diagram of a near-eye-display (NED), in accordance with an embodiment.

FIG. 1 is a diagram of a near-eye-display (NED) 100, in accordance with an embodiment. The NED 100 presents media to a user. Examples of media presented by the NED 100 include one or more images, video, audio, or some combination thereof. In some embodiments, audio is presented via an external device (e.g., speakers and/or headphones) that receives audio information from the NED 100, a console (not shown), or both, and presents audio data based on the audio information. The NED 100 is generally configured to operate as a VR NED. However, in some embodiments, the NED 100 may be modified to also operate as an augmented reality (AR) NED, a mixed reality (MR) NED, or some combination thereof. For example, in some embodiments, the NED 100 may augment views of a physical, real-world environment with computer-generated elements (e.g., images, video, sound, etc.).

The NED 100 shown in FIG. 1 includes a frame 105 and a display 110. The frame 105 includes one or more optical elements which together display media to users. The display 110 is configured for users to see the content presented by the NED 100. As discussed below in conjunction with FIG. 2, the display 110 includes at least one source assembly to generate an image light to present media to an eye of the user. The source assembly includes, e.g., a source, an optics system, or some combination thereof. In some embodiments, the NED 100 may be referred to as a head-mounted display (HMD).

Figure 2:
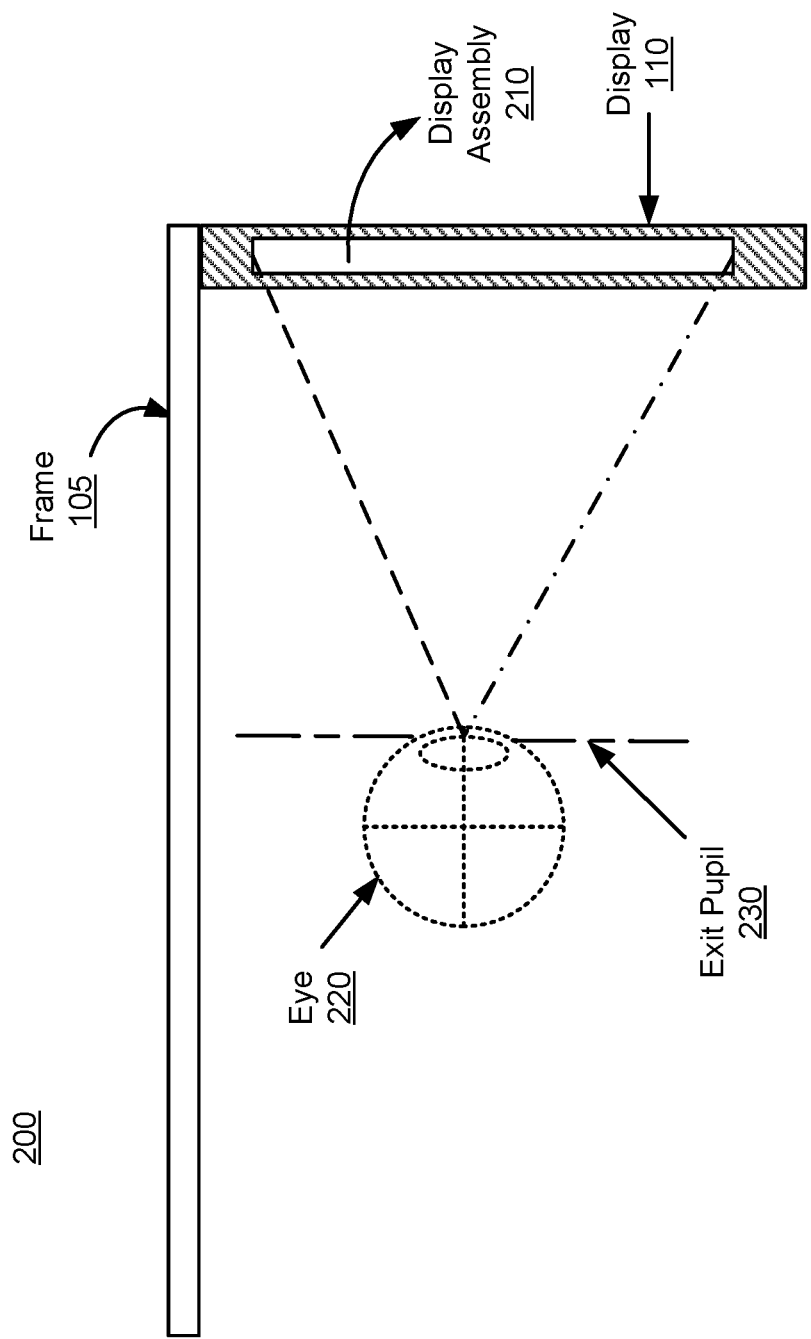
FIG. 2 is a cross-section of an eyewear of the NED illustrated in FIG. 1, in accordance with an embodiment.

FIG. 2 is a cross section 200 of the eyewear of the NED 100 illustrated in FIG. 1, in accordance with an embodiment. The cross section 200 includes at least one display assembly 210, and an exit pupil 230. The exit pupil 230 is a location where the eye 220 is positioned when the user wears the NED 100. In some embodiments, the frame 105 may represent a frame of eye-wear glasses. For purposes of illustration, FIG. 2 shows the cross section 200 associated with a single eye 220 and a single display assembly 210, but in alternative embodiments not shown, another display assembly which is separate from the display assembly 210 shown in FIG. 2, provides image light to another eye 220 of the user.

The display assembly 210, as illustrated below in FIG. 2, is configured to direct the image light to the eye 220 through the exit pupil 230. The display assembly 210 may be composed of one or more materials (e.g., plastic, glass, etc.) with one or more refractive indices that effectively minimize the weight and widen a field of view (hereinafter abbreviated as 'FOV') of the NED 100. In alternate configurations, the NED 100 includes one or more optical elements between the display assembly 210 and the eye 220. The optical elements may act to, e.g., correct aberrations in image light emitted from the display assembly 210, magnify image light emitted from the display assembly 210, some other optical adjustment of image light emitted from the display assembly 210, or some combination thereof. The example for optical elements may include an aperture, a Fresnel lens, a convex lens, a concave lens, a filter, or any other suitable optical element that affects image light.

In some embodiments, the display assembly 210 may include a source assembly (e.g., as discussed below with regard to FIGS. 3-5) to generate an image light to present media to user's eyes. The source assembly includes, e.g., a source, an optics system, or some combination thereof.

Figure 3:
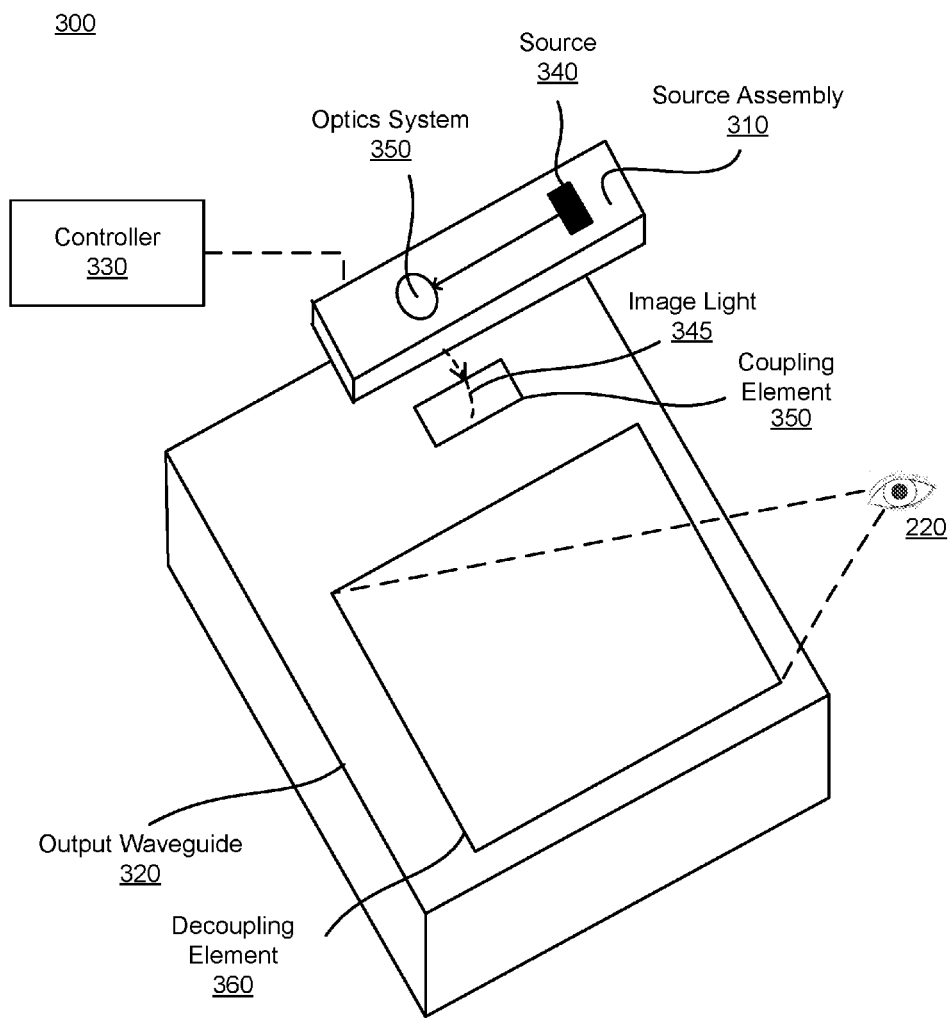
FIG. 3 illustrates an isometric view of a waveguide display, in accordance with an embodiment.

FIG. 3 illustrates an isometric view of a waveguide display 300, in accordance with an embodiment. In some embodiments, the waveguide display 300 (may also be referred to as a scanning waveguide display) is a component (e.g., display assembly 210) of the NED 100. In alternate embodiments, the waveguide display 300 is part of some other NED, or other system that directs display image light to a particular location.

The waveguide display 300 includes a source assembly 310, an output waveguide 320, and a controller 330. For purposes of illustration, FIG. 3 shows the waveguide display 300 associated with a single eye 220, but in some embodiments, another waveguide display separate (or partially separate) from the waveguide display 300, provides image light to another eye of the user. In a partially separate system, one or more components may be shared between waveguide displays for each eye.

The source assembly 310 generates image light. The source assembly 310 includes a source 340 and an optics system 350 as further described below with regard to FIGS. 4 and 5. The optical source emits image light of one or more optical wavelengths, and the optical system conditions the image light from the optical source. The source assembly 310 generates and outputs image light 345 to a coupling element 350 of the output waveguide 320.

The output waveguide 320 is an optical waveguide that outputs image light to an eye 220 of a user. The output waveguide 320 receives the image light 340 at one or more coupling elements 350, and guides the received input image light to one or more decoupling elements 360. In some embodiments, the coupling element 350 couples the image light 340 from the source assembly 310 into the output waveguide 320. The coupling element 350 may be, e.g., a diffraction grating, a holographic grating, some other element that couples the image light 340 into the output waveguide 320, or some combination thereof. For example, in embodiments where the coupling element 350 is diffraction grating, the pitch of the diffraction grating is chosen such that total internal reflection occurs, and the image light 340 propagates internally toward the decoupling element 360. For example, the pitch of the diffraction grating may be in the range of 300 nm to 600 nm.

The decoupling element 360 decouples the total internally reflected image light from the output waveguide 320. The decoupling element 360 may be, e.g., a diffraction grating, a holographic grating, some other element that decouples image light out of the output waveguide 320, or some combination thereof. For example, in embodiments where the decoupling element 360 is a diffraction grating, the pitch of the diffraction grating is chosen to cause incident image light to exit the output waveguide 320. An orientation and position of the image light exiting from the output waveguide 320 is controlled by changing an orientation and position of the image light 340 entering the coupling element 350. For example, the pitch of the diffraction grating may be in the range of 300 nm to 600 nm.

The output waveguide 320 may be composed of one or more materials that facilitate total internal reflection of the image light 340. The output waveguide 320 may be composed of e.g., silicon, plastic, glass, or polymers, or some combination thereof. The output waveguide 320 has a relatively large form factor. For example, the output waveguide 320 may be approximately 50 mm wide along X-dimension, 30 mm long along Y-dimension and 0.5-1 mm thick along Z-dimension. In some embodiments, the output waveguide 320 is a 2D optical waveguide.

The controller 330 controls the scanning operations of the source assembly 310. The controller 330 determines scanning instructions for the source assembly 310 based at least on the one or more display instructions. Display instructions are instructions to render one or more images. In some embodiments, display instructions may simply be an image file (e.g., bitmap). The display instructions may be received from, e.g., a console of a VR system (not shown here). Scanning instructions are instructions used by the source assembly 310 to generate image light 340. The scanning instructions may include, e.g., a type of a source of image light (e.g. monochromatic, polychromatic), a scanning rate, an orientation of a scanning mirror assembly, one or more illumination parameters (described below with reference to FIG. 4), or some combination thereof. In some embodiments, the controller 330 includes a control circuit that supplies one or more offset voltage to, e.g., a scanning mirror assembly in the optics system based on the video frames representing the media presented to user's eyes. The controller 330 includes a combination of hardware, software, and/or firmware not shown here so as not to obscure other aspects of the disclosure.

Figure 4:
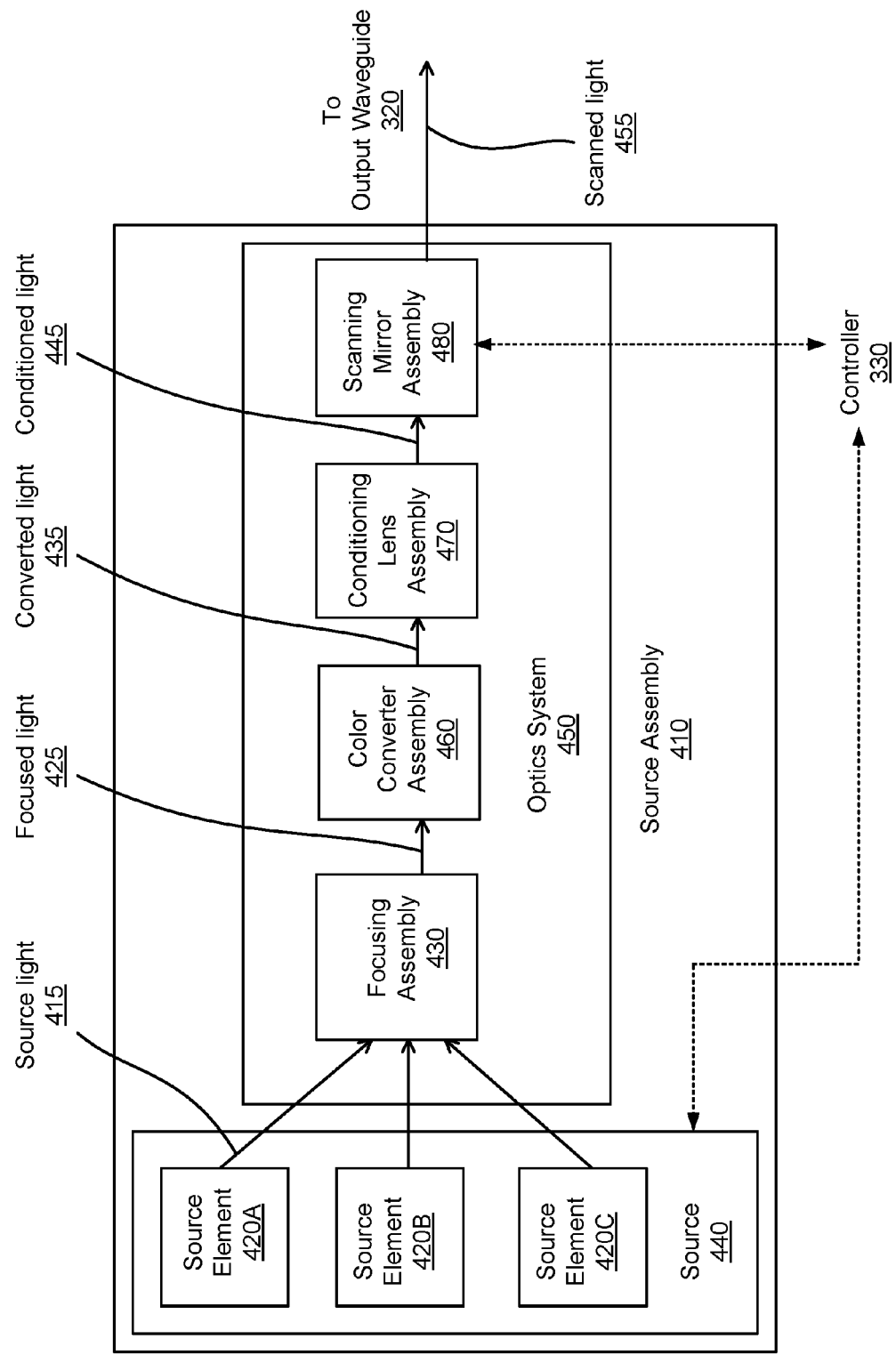
FIG. 4 illustrates a block diagram of a source assembly that includes a color converter assembly, in accordance with an embodiment.

FIG. 4 illustrates a block diagram of a source assembly 410 that includes a color converter assembly 460, in accordance with an embodiment. In some embodiments, the source assembly 410 is an embodiment of the source assembly 310 of FIG. 3. The source assembly 410 includes a source 440 and an optics system 450. Some embodiments of the source assembly 410 have different components than those described here. Similarly, in some cases, functions can be distributed among the components in a different manner than is described here.

The source 440 is a source of light that generates at least a spatially coherent or partially and spatially coherent image light. The source 440 emits light in accordance with one or more illumination parameters received from the controller 330. The source 440 includes source elements 420. A source element 420 may be a laser diode, a superluminescent LED (SLED), or a micro LED (uLED). In some embodiments, the source element 420 emits image light at a particular wavelength (e.g., 532 nanometers). The source element 420 emits a source light 415 to the optics system 450. In some embodiments, the source light 415 may emit light of one or more colors (e.g. red, green, and blue). For example, the source element 420A emits a red source light, the source element 420B emits a blue source light, and the source element 420C emits a green source light. Additionally, in some embodiments, one or more of the source elements may emit light in the infrared.

In some embodiments, the light intensity of each of the source elements 420 is modulated directly by changing the amount of input voltage over a duration of time (e.g. ~10 ns). In alternate embodiments, the light intensity of each of the source elements 420 is modulated by pulse-width-modulation by adjusting the duration of time (~0.1 ns) when the light is turned on. The output optical power from the source elements 420 may be, e.g., at least 10 mW for each of the primary colors (R, G, and B).

In some embodiments, one or more of the source elements 420 are vibrated for interlaced scanning operations. For example, to do interlacing, one or more of the source elements 420 are vibrated (by a half pitch size) such that each pixel should be displaced by half pitch size between consecutive frames. In some embodiments, the vibration speed is half of the frame rate (~30 Hz), and an amplitude of vibration is 1~3 um.

The optics system 450 performs a set of optical processes, including, but not restricted to, focusing, conditioning, and scanning processes on the source light 415. The optics system 450 includes a focusing assembly 430, a color converter assembly 460, a collimating lens assembly 470, and a scanning mirror assembly 480 assembly.

The focusing assembly 430 is an optical element that adjusts a focal depth of incident image light. The focusing assembly 430 includes one or more optical components that focus the image light from a light source. In some embodiments, the optical components include lenses, mirrors, apertures, gratings, or some combination thereof. The focusing assembly 430 adjusts the depth of focus of the source light 415 and transmits a focused light 425 to the color converter assembly 460.

The color converter assembly 460 is an optical element that changes the optical wavelength of an incident image light. The color converter assembly 460 receives the focused light 425 and converts it to a converted light 435 (e.g., a different color) that is transmitted to the collimating lens assembly 470. The color converter assembly 460 may include for example one or more devices that perform a non-linear optical mixing process (e.g., second harmonic generation, third harmonic generation, three wave mixing, four wave mixing, etc.), a phosphor structure that converts light from one wavelength to a lower wavelength, some other structure that converts light at one wavelength to some other wavelength, or some combination thereof. The converted light 435 is light that is at a different range of optical wavelengths than the source light 415. For example, the converted light 435 can be one of the primary colors (e.g. red). In some embodiments, for a given time period, light from all of the source elements are converted to a same color (e.g., red). In alternate embodiments, light from different source elements may be converted into different colors (e.g., light from source element 420A may be converted into blue light, light from source element 420B may be converted into green light, etc.)

In some embodiments, the color converter assembly 460 further includes one or more pinholes through which the converted light 435 exits from the color converter assembly 460 in order to suppress any light scattered inside the color converter assembly 460. The pinholes in the color converter assembly 460 improve the spatial coherency of the converted light 435.

In alternate embodiments, the color converter assembly 460 comprises an array of color converters outputting the converted light 435. For example, a first set of color converters in the array may output a first converted light 435A at a first color, and a second set of color converters in the array may output a second converted light 435B at a second color. Additionally, the bandwidth may be the same or differ between sets of source elements. For example, the first colored light may have a bandwidth of 30 nm and the second colored light may have a bandwidth of 10 nm.

The conditioning lens assembly 470 conditions incident light. The conditioning lens assembly 470 includes one or more optical elements that condition light. The conditioning lens assembly 470 conditions the converted light 435 to output conditioned light 445. Conditioning light may include, e.g., collimating, error correction, beam adjustment (e.g., expansion contraction), beam direction, some other operation which prepares light for the scanning mirror assembly 480, or some combination thereof. For example, in some embodiments, the conditioning lens assembly 470 collimates the converted light 435 to output a conditioned light 445 to the scanning mirror assembly 480.

The scanning mirror assembly 480 is a set of optical elements that scan incident conditioned light 445 in at least along one dimension based on scanning instructions from a controller. The scanning mirror assembly 480 includes optical elements that redirect image light via one or more reflective portions of the scanning mirror assembly 480 based on specific orientations of the reflective portions. For example, the optical elements may include one or more scanning mirrors that scan an incident image light. In some embodiments, the scanning mirror assembly 480 includes a scanning mirror that scans in at least two dimensions (e.g. horizontal and vertical dimensions). In other embodiments, the scanning mirror assembly 480 includes a plurality of scanning mirrors that each scan in orthogonal directions to each other. The scanning mirror assembly 480 can also perform a raster scanning both horizontally and vertically. The scanning mirror assembly 480 reflects a scanned light 455 based on the conditioned light 445. The scanning mirror assembly 480 reflects the scanned light 455 at a particular orientation (in accordance with the scanning instructions) toward the output waveguide 320.

In some embodiments, the scanning mirror assembly 480 includes a galvanometer mirror. For example, the galvanometer mirror may represent any electromechanical instrument that indicates that it has sensed an electric current by deflecting a beam of image light with one or more mirrors. The galvanometer mirror may be configured to scan in at least one orthogonal dimension to generate the scanned light 455. The scanned light 455 from the galvanometer mirror represents a two-dimensional line image of the media presented to user's eyes. In alternate embodiments, the scanning mirror assembly 480 includes a MEMS mirror. For example, the MEMS mirror can include a plurality of micro fabricated optical components made on a semiconductor wafer.

The controller 330 controls the source 440 and the scanning mirror assembly 480. The controller 330 takes content for display, and divides the content into pixels. The controller 330 instructs the source 440 to sequentially change the source elements 420. The controller 330 instructs the scanning mirror assembly 480 to scan the presented source elements 420 to different areas of a coupling element of the output waveguide such that the multiple imaging points in the NED 100 with a corresponding angle generated by the source assembly 410 remains constant when passing through the output waveguide 320. Accordingly, at the exit pupil of the output waveguide 320 each discrete portion is presented in a different location. While each discrete section is presented at different times, the presentation and scanning of the discrete sections occurs fast enough such that a user's eye integrates the different sections into a single image or series of images.

For example, in embodiments where the source 440 includes a linear one-dimensional array of source elements, the content is divided by the controller 330 into lines where the lines are scanned out to different areas of the coupling element of the output waveguide 320, such that the multiple imaging points in the NED 100 with a corresponding angle generated by the source assembly 410 remains constant when passing through the output waveguide 320.

The controller 330 also includes a control circuit that applies one or more offset voltage to the scanning mirror assembly 480 based on the current and the adjacent video frames representing the media presented to user's eyes. The scanning mirror assembly 480 includes a MEMS slow axis mirror that undergoes an interlacing based on the value of the offset voltage received from the controller 330. The scanning mirror assembly 480 includes the MEMS slow axis mirror to reduce the scanning rate by half. For example, when targeting frame rate is 60 Hz, the scanning rate of the MEMS slow axis can be 30 Hz with interleaving method.

In some configurations, the controller 330 provides scanning instructions that shift the position of the scanning mirror assembly 480 by changing the scanning pattern of the scanning mirror assembly 480. For example, the control circuit may apply an offset voltage while performing scanning along the Y-dimension to shift the video frames slightly in an angular space. The interlaced scanning operation performed by the controller 330 reduces the mirror resonance frequency by at least a factor of two. Thus, the interlaced scanning reduces the number of lines that can be scanned in a vertical (slow-axis) direction.

Figure 5:
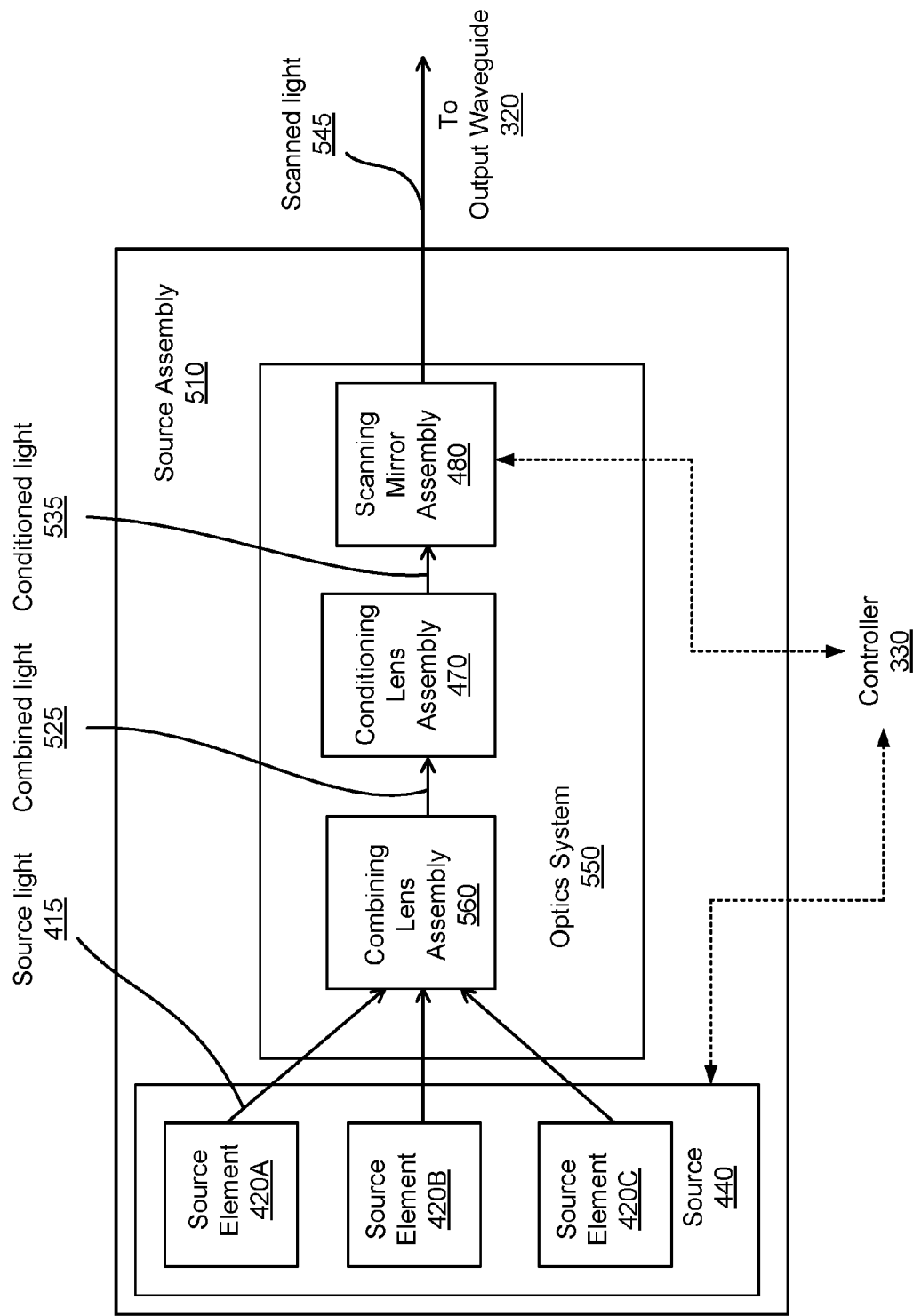
FIG. 5 illustrates a block diagram of a source assembly that includes a combining lens assembly, in accordance with an embodiment.

FIG. 5 illustrates a block diagram of a source assembly 510 including a combining lens assembly 560, in accordance with an embodiment. In some embodiments, the source assembly 510 is a component of the source assembly 310 of FIG. 3. The source assembly 510 includes the source 440, as described above with reference to FIG. 4 and an optics system 550. Some embodiments of the source assembly 510 have different components than those described here. Similarly, in some cases, functions can be distributed among the components in a different manner than is described here.

The optics system 550 generates scanned light 545 that is coupled to the output waveguide 320. The optics system 550 includes a combining lens assembly 560, the collimating lens assembly 470, and the scanning mirror assembly 480.

The combining lens assembly 560 is a set of optical components that performs a blending of an image light into combined light 525. In one example, the combining lens assembly 560 receives image light from three source elements (e.g. outputting red light, green light, and blue light) and combines them into a single output (e.g., exiting through a fiber-optic cable). In some embodiments, the combining assembly 560 includes, for example, a series of dichroic mirrors that reflect particular bands of light, but transmit other bands of light. An example, embodiment of the combining lens assembly 560 based on a plurality of dichroic mirrors is discussed below with regard to FIG. 6. In alternate embodiments, the combining lens assembly 560 includes one or more polarizing element such as a polarizing beam splitter that can spatially combine one or more polarized light from the source elements 420.

In a different configuration, the combining lens assembly 560 includes multiple optical components that can be placed adjacent to each other. For example, each of the optical components is placed such that each optical component outputs a combined light 525 corresponding to each of the primary colors.

As described above with regard to FIG. 4, the conditioning lens assembly 470 conditions the combined light 525 and transmits the conditioned light 535. The scanning mirror assembly 480 performs a scanning on the conditioned light 535 to reflect a scanned light 545 toward the output waveguide 320. The controller 330 controls the source 440 and the scanning mirror assembly 480 as described above with reference to FIG. 4.

The controller 330 includes a control circuit that applies offset voltage to one or more MEMS mirrors of the scanning mirror assembly 480 based on the current and adjacent video frames representing the media presented to user's eyes. In some configurations, the source assembly 510 includes a first controller 330A that performs the interlaced scanning of the scanning mirror assembly 480, and a second controller 330B that sends scanning instructions to the source 440.

Figure 6:
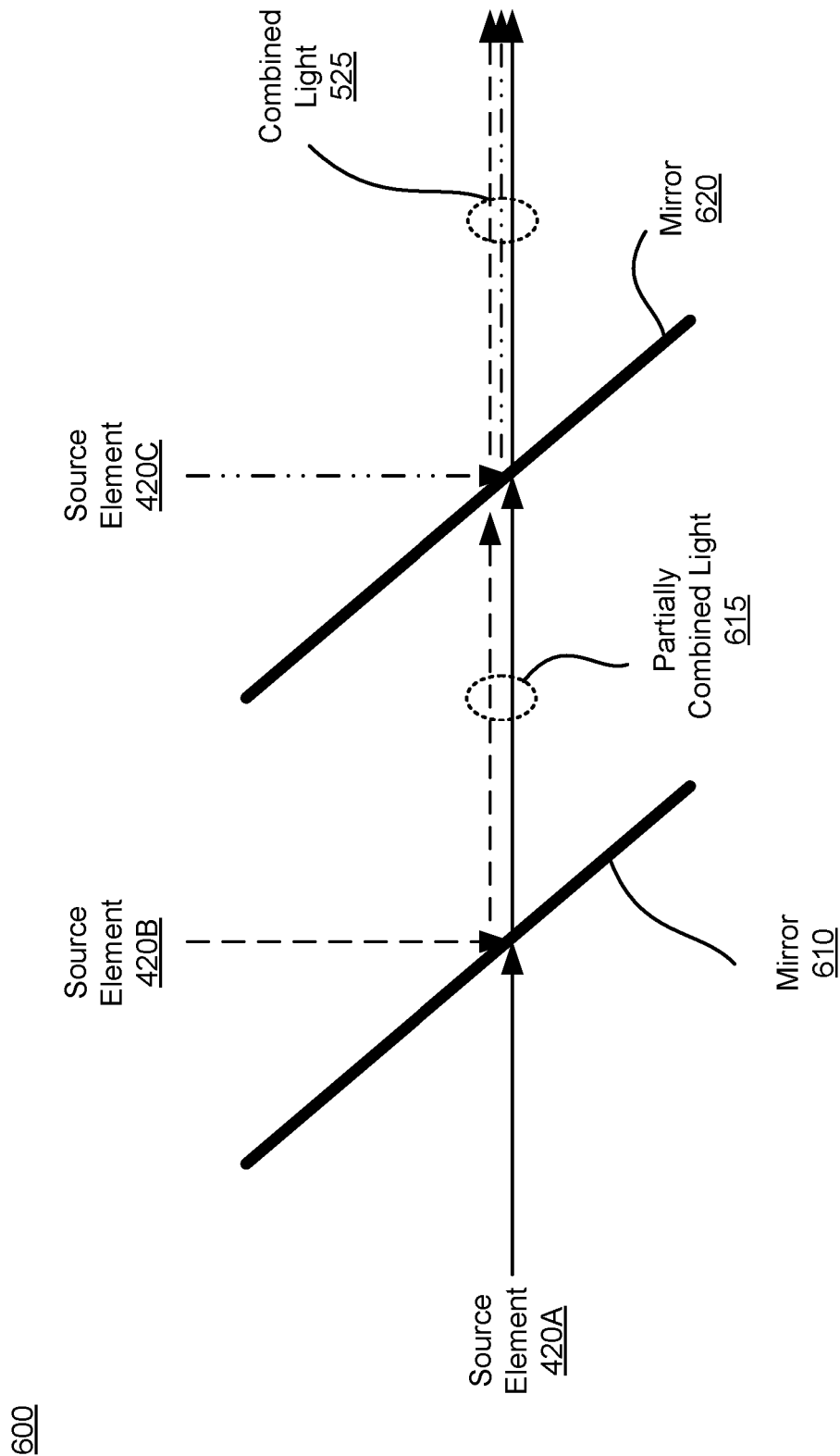
FIG. 6 illustrates a combining lens assembly, in accordance with an embodiment.

FIG. 6 illustrates a combining lens assembly 600, in accordance with an embodiment. The combining lens assembly 600 is an embodiment of the combining lens assembly 560. The combing lens assembly 600 includes a mirror 610 and a mirror 620. The mirrors 610 and 620 are dichroic mirrors. The mirror 610 has a transmission pass band that includes light emitted by the source element 420A, and has a reflection pass band that includes light emitted from the source element 420B. In contrast, the mirror 620 has a transmission pass band that includes light emitted by the source element 420A and 420B, and has a reflection pass band that includes light emitted from the source element 420C. Light from the source element 420 is transmitted by the mirror 610. Light from the source element 420B is reflected by the mirror 610 such that it creates a partially combined light 615. The partially combined light 615 is transmitted by the mirror 620. And light from the source element 420C is reflected by the mirror 620 such that it combines with the partially combined light 615 to form the combined light 525. While FIG. 6 illustrates an example including two mirrors and 3 different source elements, in other embodiments, more and/or less mirrors and/or light from source elements may be combined in similar manner to form the combined light 525.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in image light of the above disclosure.

Finally, the language used in the specification has been principally selected for readability and instructional purposes, and it may not have been selected to delineate or circumscribe the disclosed subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure.

What is claimed is:

1. A waveguide display, comprising:
a light source including a plurality of source elements that are configured to emit image light in accordance with scanning instructions, and the plurality of source elements are coherent light sources;
a conditioning lens assembly configured to transmit conditioned light based in part on the image light;
a scanning mirror assembly configured to scan the conditioned image light to particular locations as scanned image light in accordance with scanning instructions;
an output waveguide including an input area and an output area, the output waveguide coupled to receive the scanned image light emitted from the scanning mirror assembly at the input area, and output expanded image light from a portion of the output area, and a location of the portion of the output area is based in part on a direction of the scanned image light output from the scanning mirror assembly; and
a controller configured to generate the scanning instructions and provide the scanning instructions to at least the light source and the scanning mirror assembly.

2. The waveguide display of claim 1, wherein the scanning mirror assembly comprises a galvanometer mirror.

3. The waveguide display of claim 1, wherein the scanning mirror assembly comprises a MEMS mirror.

4. The waveguide display of claim 1, wherein the plurality of source elements each emit light of a specific wavelength.

5. The waveguide display of claim 1, wherein the plurality of source elements include at least one source element that emits light in a different range of wavelengths than another of the plurality of source elements.

6. The waveguide display of claim 1, wherein the controller instructs the scanning mirror assembly to interlace the scanned image light.

7. The waveguide display of claim 1, further comprising:
a color converter assembly configured to convert the image light to one or more different wavelengths.

8. The waveguide display of claim 7, wherein the color converter assembly further comprises a pinhole, and the pinhole is configured to transmit the converted image light to the conditioning lens assembly.

9. The waveguide display of claim 7, further comprising:
a focusing assembly configured to couple the image light into the color converter assembly.

10. The waveguide display of claim 1, further comprising:
a combining lens assembly that combines light from each of the source elements into a combined light, wherein the combining lens assembly comprises:
a first dichroic mirror that is associated with a first pass band and a first reflection band, and image light emitted from a first source element, of the plurality of source elements, is in the first pass band, and image light emitted from a second source element, of the plurality of source elements, is in the first reflection band, and
a second dichroic mirror that is associated with a second pass band and a second reflection band, and image light emitted from the first source element and the second source element are in the second pass band, and image light emitted from a third source element, of the plurality of source elements, is in the reflection band, and
wherein the light from the first source element is transmitted through the first mirror and combines with the light reflected from the first mirror from the second source element to create partially combined light, and the partially combined light is transmitted through the second mirror and combines with the light from the third source element to create the combined light that is coupled into the conditioning lens assembly.

11. A waveguide display comprising:
a light source including a plurality of source elements that are configured to emit image light in accordance with scanning instructions, and the plurality of source elements includes at least one source element that emits semi-coherent light and at least one source element that emits coherent light;
a conditioning lens assembly configured to transmit collimated light based in part on the image light;
a scanning mirror assembly configured to scan the collimated image light to particular locations as scanned image light in accordance with scanning instructions;
an output waveguide including an input area and an output area, the output waveguide coupled to receive the scanned image light emitted from the scanning mirror assembly at the input area, and output expanded image light from a portion of the output area, and a location of the portion of the output area is based in part on a direction of the scanned image light output from the scanning mirror assembly; and
a controller configured to generate the scanning instructions and provide the scanning instructions to at least the light source and the scanning mirror assembly.

12. The waveguide display of claim 11, wherein the scanning mirror assembly comprises a galvanometer mirror.

13. The waveguide display of claim 11, wherein the scanning mirror assembly comprises a MEMS mirror.

14. The waveguide display of claim 11, wherein the plurality of source elements each emit light of a specific wavelength.

15. The waveguide display of claim 11, wherein the plurality of source elements include at least one source element what emits light in a different range of wavelengths than another of the plurality of source elements.

16. The waveguide display of claim 11, wherein the controller instructs the scanning mirror assembly to interlace the scanned image light.

17. The waveguide display of claim 11, further comprising:
a color converter assembly configured to convert the image light to one or more different wavelengths.

18. The waveguide display of claim 17, wherein the color converter assembly further comprises a pinhole, and the pinhole is configured to transmit the converted image light to the conditioning lens assembly.

19. The waveguide display of claim 17, further comprising:
a focusing assembly configured to couple the image light into the color converter assembly.

20. The waveguide display of claim 11, further comprising:
a combining lens assembly that combines light from each of the source elements into a combined light, wherein the combining lens assembly comprises:
a first dichroic mirror that is associated with a first pass band and a first reflection band, and image light emitted from a first source element, of the plurality of source elements, is in the first pass band, and image light emitted from a second source element, of the plurality of source elements, is in the first reflection band, and
a second dichroic mirror that is associated with a second pass band and a second reflection band, and image light emitted from the first source element the second source element are in the second pass band, and image light emitted from a third source element, of the plurality of source elements, is in the reflection band, and
wherein the light from the first source element is transmitted through the first mirror and combines with the light reflected from the first mirror from the second source element to create partially combined light, and the partially combined light is transmitted through the second mirror and combines with the light from the third source element to create the combined light that is coupled into the conditioning lens assembly.

21. A waveguide display, comprising:
a light source configured to emit image light;
a conditioning lens assembly configured to transmit conditioned light based in part on the image light;
a scanning mirror assembly configured to scan the conditioned image light to particular locations as scanned image light; and
an output waveguide including an input area and an output area, the output waveguide coupled to receive the scanned image light emitted from the scanning mirror assembly at the input area, and output expanded image light from a portion of the output area, and a location of the portion of the output area is based in part on a direction of the scanned image light output from the scanning mirror assembly.

22. The waveguide display of claim 21, wherein the light source includes a plurality of source elements that are configured to emit image light in accordance with scanning instructions.

23. The waveguide display of claim 22, wherein each of the plurality of source elements emit light of a specific wavelength.

24. The waveguide display of claim 22, wherein the plurality of source elements include at least one source element that emits light in a different range of wavelengths than another of the plurality of source elements.

25. The waveguide display of claim 22, further comprising:
a combining lens assembly that combines light from each of the source elements into a combined light, wherein the combining lens assembly comprises:
a first dichroic mirror that is associated with a first pass band and a first reflection band, and image light emitted from a first source element, of the plurality of source elements, is in the first pass band, and image light emitted from a second source element, of the plurality of source elements, is in the first reflection band, and
a second dichroic mirror that is associated with a second pass band and a second reflection band, and image light emitted from the first source element and the second source element are in the second pass band, and image light emitted from a third source element, of the plurality of source elements, is in the reflection band, and
wherein the light from the first source element is transmitted through the first mirror and combines with the light reflected from the first mirror from the second source element to create partially combined light, and the partially combined light is transmitted through the second mirror and combines with the light from the third source element to create the combined light that is coupled into the conditioning lens assembly.

26. The waveguide display of claim 21, wherein a controller instructs the scanning mirror assembly to interlace the scanned image light in accordance with the scanning instructions.

27. The waveguide display of claim 21, further comprising:
a color converter assembly configured to convert the image light to one or more different wavelengths.

28. The waveguide display of claim 27, wherein the color converter assembly further comprises a pinhole, and the pinhole is configured to transmit the converted image light to the conditioning lens assembly.

29. The waveguide display of claim 27, further comprising:
a focusing assembly configured to couple the image light into the color converter assembly.

* * * * *